(12) United States Patent
Marcy (10) Patent No.: US 8,448,666 B2
(45) Date of Patent: May 28, 2013

(54) WATER SUPPLY SYSTEM FOR A LINEARLY MOVING SPRINKLER IRRIGATION SYSTEM

(76) Inventor: Samuel J. Marcy, Cheyenne, WY (US)

( * ) Notice: Subject to any disclaimer, the term of this patent is extended or adjusted under 35 U.S.C. 154(b) by 113 days.

(21) Appl. No.: 12/930,953

(22) Filed: Jan. 20, 2011

(65) Prior Publication Data

US 2011/0114200 A1 May 19, 2011

Related U.S. Application Data (63) Continuation-in-part of application No. 11/445,705, filed on Jun. 2, 2006, now abandoned.

(60) Provisional application No. 60/688,117, filed on Jun. 7, 2005.

(51) Int. Cl.
*F16L 27/00* (2006.01)

(52) U.S. Cl.
USPC ...... 137/580; 137/565.01; 239/748; 138/128; 138/166

(58) Field of Classification Search
USPC .................. 137/580, 565.01, 565.3; 138/128, 138/166, 156; 239/722, 723, 748, 740, 726, 239/734, 750, 728, 724
See application file for complete search history.

(56) References Cited

U.S. PATENT DOCUMENTS

| | | | |
|---|---|---|---|
| 1,154,955 A | | 9/1915 | Willis |
| 2,974,876 A | | 3/1961 | Poynor |
| 3,011,502 A | | 12/1961 | Jordan |
| 3,019,813 A | | 2/1962 | Dommann |
| 3,217,725 A | * | 11/1965 | Varian .............................. 137/1 |
| 3,584,463 A | | 6/1971 | Hansen |
| 3,592,220 A | | 7/1971 | Reinke |
| 3,903,917 A | | 9/1975 | Ede |
| 4,219,043 A | | 8/1980 | Zimmerer |
| 4,222,520 A | | 9/1980 | Melcher |
| 4,576,335 A | | 3/1986 | McAbery |
| 5,265,810 A | * | 11/1993 | Chapman ..................... 239/724 |

* cited by examiner

*Primary Examiner* — John K Fristoe, Jr.
*Assistant Examiner* — Andrew J Rost
(74) *Attorney, Agent, or Firm* — Dean P. Edmundson (57) ABSTRACT

A water supply system is described for supplying water to a linearly moving irrigation system. The water supply system is able to take water from a stationary water supply conduit (either a collapsible conduit or a rigid conduit) and feed it into one end of a feed pipe for the irrigation system. The water supply system includes a pickup shoe which extends into the water supply conduit through a traveling opening in the top side of the conduit. The pickup shoe intercepts substantially all of the water in the supply conduit and pumps it upwardly through the traveling opening to the feed pipe for the irrigation system. The pump is located in the portion of the shoe which extends into the supply conduit.

13 Claims, 12 Drawing Sheets

WATER SUPPLY SYSTEM FOR A LINEARLY MOVING SPRINKLER IRRIGATION SYSTEM

CROSS-REFERENCE TO RELATED APPLICATION

This application is a continuation-in-part of my application Ser. No. 11/445,705, filed Jun. 2, 2006 now abandoned, which is based upon, and claims priority from, my Provisional Application No. 60/688,117, filed Jun. 7, 2005.

FIELD OF THE INVENTION

This invention relates generally to field irrigation systems. More particularly, this invention relates to linearly moving sprinkler systems. Even more particularly, this invention relates to water supply systems for supplying water from a stationary conduit at a continuously changing location to a linearly moving sprinkler irrigation system.

BACKGROUND OF THE PRIOR ART

Efficient irrigation of large fields with sprinklers requires that a relatively small number of sprinkling nozzles be moved over the field. One method of accomplishing this is to mount these nozzles on an overhead moving pipeline. The most prominent system now in use is called a center pivot and consists of an overhead pipeline supported by towers on wheels. The overhead pipeline rotates about a fixed point called the pivot. Water is supplied to the pipeline at this fixed pivot point and flows radially outward to the nozzles mounted on the pipeline. The resulting paths taken by the nozzles are concentric circles. Disadvantages of the center pivot system are adapting the circular pattern to square or rectangular fields and the fact that each nozzle travels at a rate proportional to its distance from the pivot point and must therefore be individually calibrated such that the rate of water application is as uniform as possible over the entire field.

Linear systems, sometimes called lateral move systems, also consist of an overhead pipeline supported by towers on wheels. Linear systems move perpendicular to the axis of the pipeline such that all points on the pipeline move at the same rate. Linear systems alleviate the two listed disadvantages of the center pivot system because their spraying patterns are rectangular and each nozzle sprays at the same rate, but they create another problem of their own. This problem is getting the supply water into the moving linear irrigation system. Because of this problem and the high cost of overcoming it with existing technology, linear systems are not now as widely used as are center pivot systems.

In general, there are two methods that are now in use to get supply water into a moving linear irrigation system. They are the ditch feed method and the hose drag method. The ditch feed method requires that there be an open ditch adjacent to or through the field carrying more water than is needed to irrigate the field. For the great majority of fields, this is not feasible, so that the hose drag method is now the most prevalent method of getting supply water into a moving linear irrigation system. A hose drag system consists of a hose attached at one end to a fixed hydrant and at the other end to the moving overhead pipeline system. The hose is doubled back on itself with a 180° bend so that it can accommodate the changing distance between the fixed hydrant and the moving overhead pipeline.

Hose drag systems are cumbersome and expensive. The length of hose that can be dragged is limited by the traction of the drive wheels of the linear irrigation system and this limit is generally less than desired. Thus, more than one hydrant is needed, which requires additional underground pipelines to the additional hydrants. Switching from one hydrant to the next is a significant chore that requires a shut-down of the system while the hose is dragged to the next hydrant. To accommodate the high flow rates necessary to irrigate large fields, the hose must be relatively large in diameter and therefore heavy when filled with water. Forces required to drag it are substantial. The hose itself must be strong enough to transmit these forces. The hose must also be flexible and resistant to wear. A smooth strip of land at least twice as wide as the minimum bending radius of the hose must be provided for dragging the hose, and this strip of land cannot otherwise be utilized. Clearly, there is a need for a better system for getting supply water to a moving linear irrigation system.

In 1971 U.S. Pat. No. 3,592,220 (Reinke) was issued for a LINEAR IRRIGATION SYSTEM WITH PICKUP SHOE. The patent discloses a system for withdrawing fluid from a stationary closed conduit at a continuously changing location in order to supply a linear irrigation system. However, a system using the concept disclosed in the patent is not available on the market.

In the aforementioned Reinke patent, it appears that the water conduit 104 must be rigid, and the water in the conduit must be pressurized in order to keep the slit closed in the top of the conduit. It further appears that the water pressure in conduit 104 is substantially the same along the full length of that conduit, both upstream and downstream from the pickup shoe 94. Another disadvantage of the Reinke system is that a peripheral seal 102 is required which is external to the conduit and extends the length of the pickup shoe. The seal is subject to leakage whenever the pickup shoe and the conduit are not in perfect alignment.

In 1980 U.S. Pat. No. 4,219,043 (Zimmerer et al.) was issued for Continuous-Feed Fluid Supply Apparatus. The patent describes apparatus for supplying water or other fluids from a stationary pipe to a moving pipe. A system using this concept is not available on the market. The stationary supply conduit has a seam which can be opened and closed somewhat like a zipper. An extractor is located inside the supply conduit and has a riser portion which protrudes through an opening in the seam. The extractor includes a generally cylindrical body portion. There is no description of a pump in the tube for pressurizing the water and pushing it upwardly. Apparently in Zimmerer's system the water pressure in the supply conduit is responsible for pushing the water out through the riser portion. This would normally preclude the use of thin-walled plastic conduits.

Other patents that disclose traveling openings in closed conduits are U.S. Pat. Nos. 3,903,917 (Ede); 3,011,502 (Jordan); 3,019,813 (Dormann); 2,974,876 (Poynor); and 4,576,335 (McAberg). None of these systems appear to have been commercialized, possibly due to leakage past the seals.

Another type of prior art includes the technology previously used in designs for closing plastic bags and is marketed under trade names such as ZIPLOC, HEFTY ONE, ZIP, GLAD LOCK, and others, and it is disclosed in numerous patents including U.S. Pat. Nos. 4,212,337; 3,173,184; 5,664,299; and many others.

There has not heretofore been provided a moving linear irrigation system which is able to effectively and efficiently remove water from a low pressure supply conduit and use that water in a moving sprinkler apparatus.

SUMMARY OF THE INVENTION

The present invention provides apparatus and techniques to get supply water from a fixed location such as a well or hydrant to a moving linear irrigation system in an economical and convenient manner. Water from the fixed location is directed to a stationary water conveyance system, i.e. a closed conduit. The stationary water conveyance system has a traveling opening such that a pressurizing pickup shoe mounted on a moving linear irrigation system can extend down through the traveling opening in the stationary water conveyance system to take water from that system. The pressurizing pickup shoe comprises (1) an inlet for intercepting the water in the stationary water conveyance system (i.e. a conduit), (2) a seal (preferably around the periphery of the portion of the pickup shoe which is inside the conduit) for maximizing the amount of water intercepted and for separating that portion of the conduit containing water from the downstream portion that should be empty; (3) a pump for pressurizing the water in the pickup shoe; and (4) a suitable channel (i.e. a neck or riser portion) for passing the water up through the traveling opening into the moving linear irrigation system. The channel can be shaped to conform to the shape of the traveling opening in the stationary water conveyance system (i.e. conduit). The channel must contain a compartment for getting power down to the pump and must furnish structural support for the pump, the pump motor and the rest of the pressurizing pickup shoe.

The first embodiment of the present invention utilizes a thin-walled flexible and collapsible plastic tube for the stationary water conveyance system (i.e. the water conduit). The thin-walled plastic tube has a longitudinal slit running the length of the tube, and the slit is closed with a long adaptation of a reclosable fastener assembly such as those used to open and close small plastic household containers and know by tradenames such as ZIPLOC, HEFTY ONE ZIP, GLAD. LOCK or other similar identities.

A second embodiment of the invention uses a rigid stationary closed conduit with a slit running the length of the rigid stationary closed conduit. The slit is held in a normally closed position by spring forces that are either built into the wall of the stationary closed conduit or press against the external wall of the stationary closed conduit. The flattened and streamlined neck or riser portion of the pressurizing pickup shoe has a wedge shape on each end that pries open the slit as the linear irrigation system moves along the slitted rigid stationary closed conduit. Flanges extending radially outward can be provided on both sides of the slit, both to facilitate the prying and to assist in sealing the slitted rigid stationary closed conduit against leakage.

In addition to supplying water to a linearly moving sprinkler irrigation system, the invention may also be used to supply water to high pressure squirt guns, thereby replacing the costly heavy duty hose reels now in use.

BRIEF DESCRIPTION OF THE DRAWINGS

FIG. 13 is similar to FIG. 7 except that FIG. 13 illustrates the pressurizing pickup shoe needed for the second embodiment of the invention which utilizes a rigid stationary closed conduit in place of the flexible and collapsible stationary closed conduits of embodiment one. FIG. 13 is a plan view of that portion of a specially adapted pressurizing pickup shoe that would remain after a horizontal cut through the neck of the pressurizing pickup shoe.

DETAILED DESCRIPTION OF THE INVENTION

Figure 1:
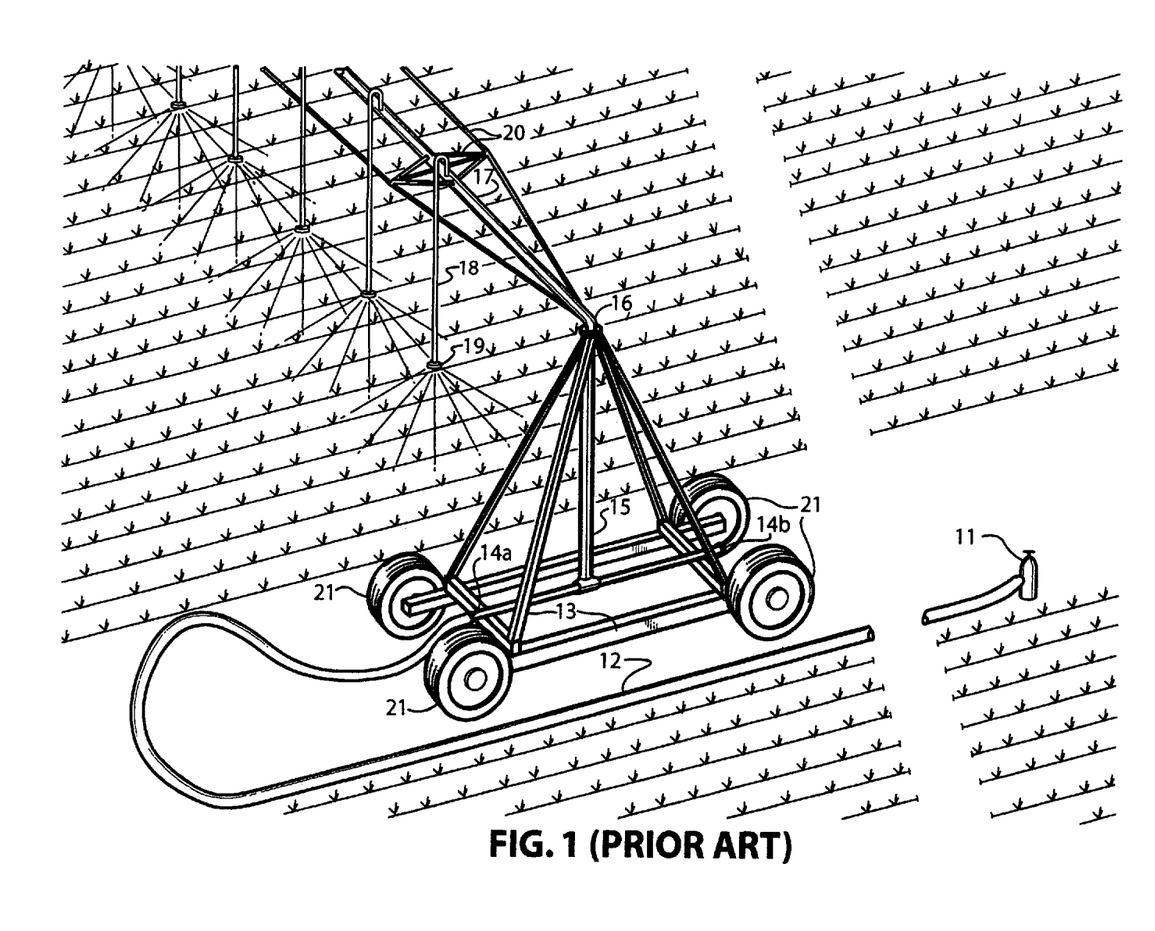
FIG. 1 illustrates the most common prior art method now in use for getting supply water to a linear irrigation system. Typically the four-wheel cart shown in FIG. 1 will have a platform on which an engine, generator or oil pump and various panels and controls are mounted, but the platform and items mounted thereon are not shown here for reasons of clarity.

FIG. 1 shows a prior art technique and system for getting water into a linear irrigation system and sprayed onto crops. Water from hydrant 11 enters hose 12, which is connected to cart 13 at either point 14a or 14b. The water then flows up vertical feed pipe 15 to a swivel connection 16, thence out into a main water line 17. The water then flows down through drops 18 to nozzles 19 where it is sprayed onto the crops. Swivel connection 16 enables the main line to be rotated 180° so that crops on the opposite side of cart 13 can be irrigated. The main water line 17 is supported by truss structure 20. Cart 13 has drive wheels 21 which propel the cart 13 down the field, dragging one end of hose 12 along with it.

Figure 2:
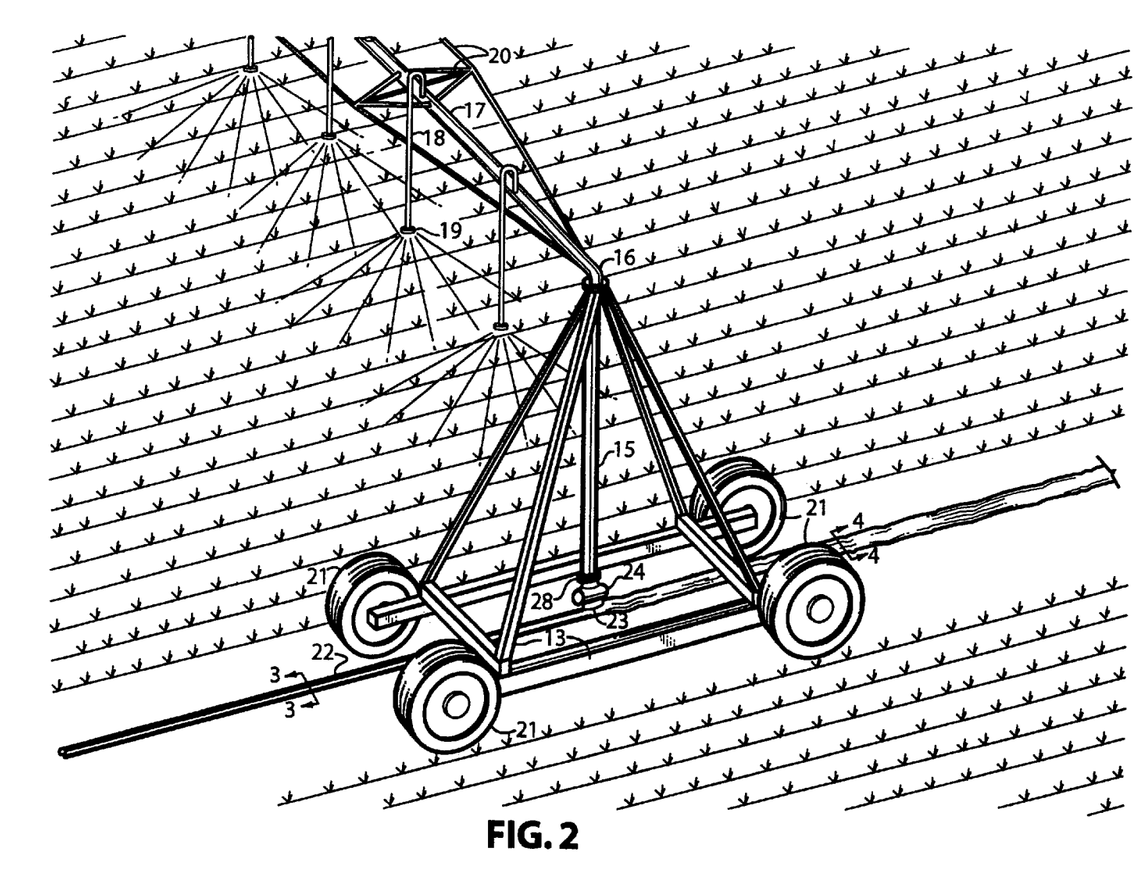
FIG. 2 is similar to FIG. 1 except that the present invention is used for getting supply water to the linear irrigation system.

FIG. 2 illustrates how the present invention connects with the sprinkler apparatus of the type shown in FIG. 1. Water is directed into stationary closed conduit 22. Conduit 22 has a traveling opening 23 that moves together with cart 13 such that the traveling opening 23 remains directly under cart 13. A pressurizing pickup shoe 24 extends through traveling opening 23 into conduit 22. Pressurizing pickup shoe 24 picks up water from the conduit 22, pressurizes it, and directs it out through traveling opening 23 into vertical pipe 15. The water then proceeds onto the crops in the same manner as in the system described and illustrated in connection with FIG. 1.

Figure 3:
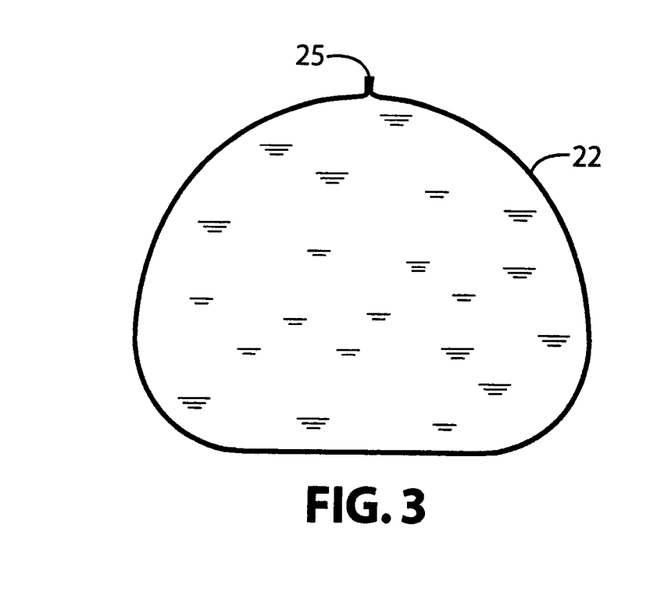
FIG. 3 is a cross-sectional view of a thin-walled flexible conduit taken along line 3-3 of FIG. 2, where the conduit is filled with water.

FIG. 3 illustrates an approximation of a typical cross-section of stationary closed conduit 22 at points between the water source and cart 13 where the conduit is full of water. Conduit 22 can be a thin-walled flexible plastic tube which has a generally flat or planar bottom surface, as shown. Conduit 22 has a longitudinal seam 25 that runs the length of the conduit 22. Longitudinal seam 25 is an adaptation of any one of numerous reclosable fastener assemblies of the prior art such as those used to open and close small plastic household containers and are known by trade names such as "Ziploc", Hefty One Zip, GLAD.LOCK, or similar identities. Longitudinal seam 25 is normally closed but can be opened to create traveling opening 23.

Figure 4:
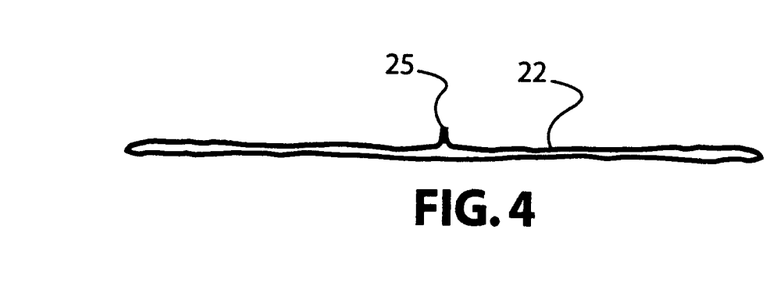
FIG. 4 is a cross-sectional view of a thin-walled flexible conduit taken along line 4-4 of FIG. 2 after the water has been removed by a pressurizing pickup shoe.

FIG. 4 illustrates a typical cross-section of stationary closed conduit 22 at points downstream from cart 13 after pressurizing pickup shoe 24 has taken the water out of conduit 22.

Figure 5:
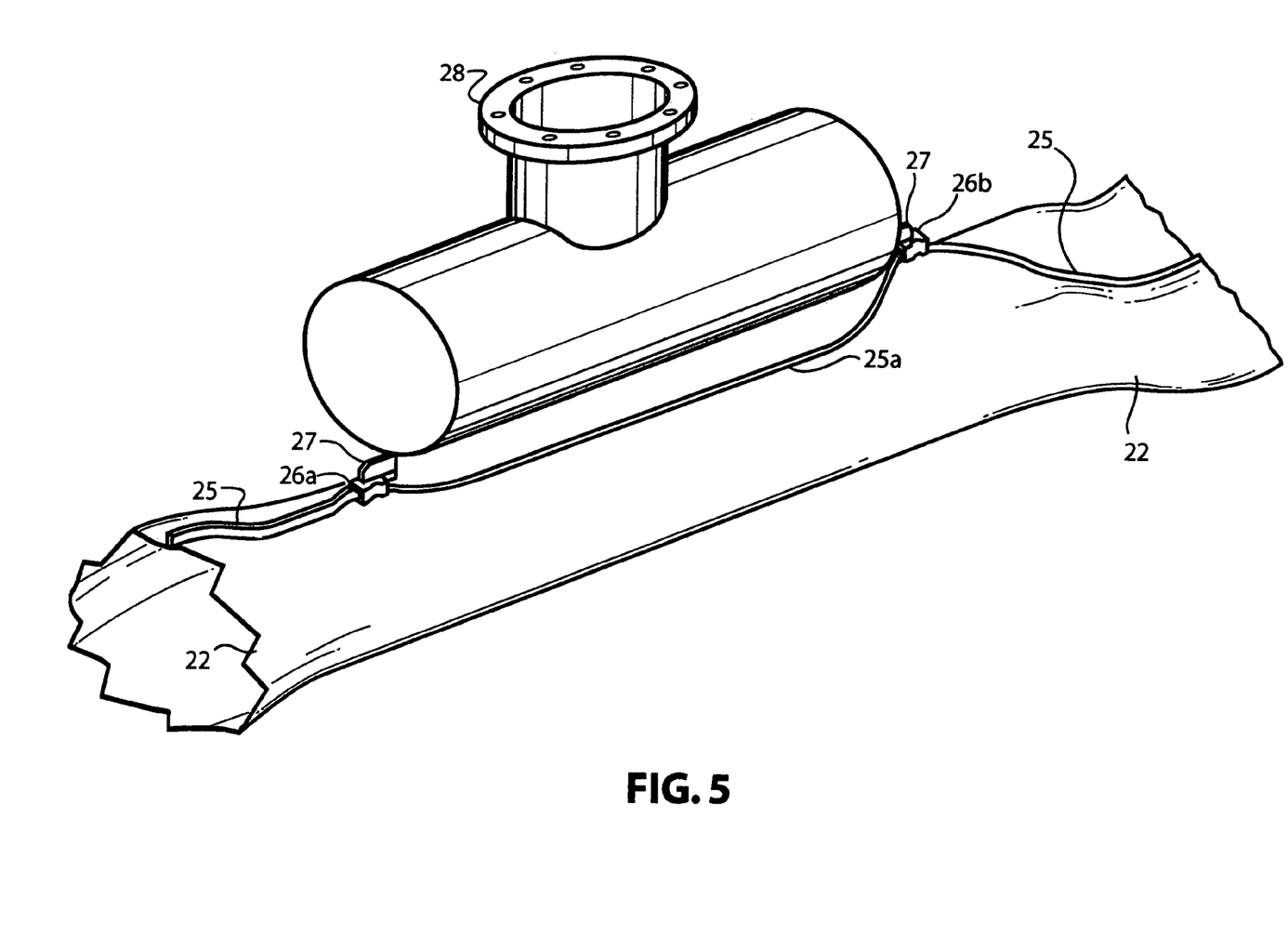
FIG. 5 is an enlarged view of the pressurizing pickup shoe.

FIG. 5 is an enlarged view of pressurizing pickup shoe 24 with stationary closed conduit 22 in place. Sliders 26a and 26b open and close seam 25. When pressurizing pickup shoe 24 and hence the whole linear irrigation system is moving to the left on FIG. 5, slider 26a will be opening seam 25, and slider 26b will be closing seam 25. When pressurizing pickup shoe 24 is moving to the right on FIG. 5, slider 26a will be closing seam 25, and slider 26b will be opening seam 25. Sliders 26a and 26b are attached to pressurizing pickup shoe 24 by brackets 27. Seam is open between sliders 26a and 26b, and is therefore separated into two parts, 25a and 25b. Seam part 25a is visible and is designated on FIG. 5, while seam part 25b is on the back side of pressurizing pickup shoe 24 and invisible on FIG. 5. Flange 28 connects pressurizing pickup shoe 24 with vertical feed pipe 15.

Figure 6:
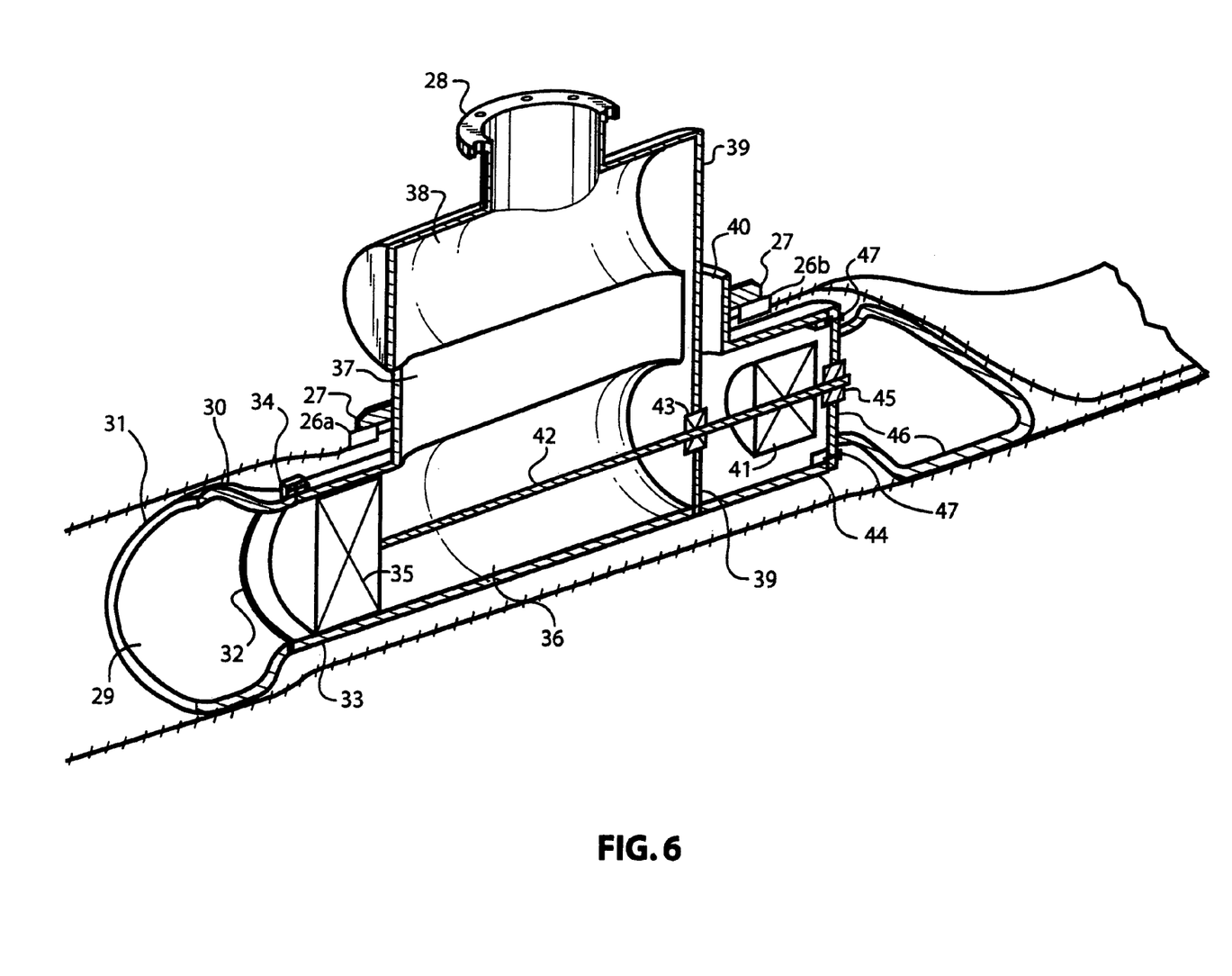
FIG. 6 is a perspective view of that portion of the pressurizing pickup shoe that would remain after a longitudinal cut along the center line of the pressurizing pickup shoe.

FIG. 6 is a perspective view of that portion of pressurizing pickup shoe 24 that would remain after a longitudinal cut along the center line and shows the inside of said pressurizing pickup shoe 24. Because the walls of conduit 22 are too thin to be properly illustrated at the cutting plane by a pair of lines with cross hatching between them, the wall of conduit 22 is illustrated at the cutting plane by a single line with cross hatching across said single line.

Water enters pressurizing pickup shoe 24 through flared inlet 29. The maximum circumference of flared inlet 29 is at location 30 and is slightly smaller than the circumference of stationary closed conduit 22 such that there will be a close fit of conduit 22 over flared inlet 29. The shape of flared inlet 29 at location 30 conforms approximately to the cross-sectional shape of closed conduit 22 as shown in FIG. 3. As noted in the foregoing, FIG. 3 is only an approximation to the shape that stationary closed conduit 22 will assume when full of water. The exact shape depends upon flow and pressure. A thin-walled plastic tube can only withstand very minimal pressure, so that the pressure in stationary closed conduit must be very low, almost nil. The lower the pressure in conduit 22, the flatter the cross section depicted in FIG. 3 will be.

The circumference of flared inlet 29 at the leading edge 31 is smaller than at location 30, and said leading edge 31 is rounded and turned inwardly in order to prevent snagging of conduit 22 as pressurizing pickup shoe 24 moves along said conduit 22. The trailing edge 32 of flared inlet 29 is circular and conforms to pump housing 33. Fasteners 34 attach flared inlet 29 to pump housing 33. If desired, a seal may be provided on the surface of inlet 29 so that there is only minimal leakage of water around the shoe. The seal may be comprised of soft pliable rubber or plastic and may be fastened to the surface of inlet 29 by means of glue or by mechanical fastener.

Pump 35 takes low pressure water from flared inlet 29 and discharges it at a higher pressure into diffusion chamber 36. If pump 35 operates too slowly, the system may become flooded. If pump 35 operates too fast, it may collapse flexible conduit 22. Therefore, pump 35 needs to be a variable speed pump governed by pressure sensors in the inlet region.

As shown in FIG. 6, pump 35 is located in the portion of the shoe 24 which is located within the conduit 22. The pump 35 receives the low pressure water from conduit 22 and pushes pressurized water upward out of the shoe and into the sprinkler supply line. In contrast to the system described in U.S. Pat. No. 3,592,220 (Reinke), there is no pressure at the traveling opening in the stationary water conveyance system of the present invention. The rigid pressurizing pickup shoe 24 extends through the traveling opening and upstream a short distance. After the water is pressurized in the pressurizing pickup shoe, the water is completely contained within a rigid system until the water exits the sprinkler system. A seal around the leading edge of the pickup shoe upstream from the traveling opening separates the portion of the stationary water conveyance system that is carrying water from the part that is empty. The seal is only subjected to the low pressures of the stationary water in the conduit 22. Because of the close fit between the pickup shoe and the interior surface of the conduit 22, essentially all of the water in the conduit 22 must pass into the leading end of the pickup shoe and pump 35. Consequently, conduit 22 is substantially void of water at all locations downstream from the pump, including the location of the traveling opening.

Pump 35 takes low pressure water from flared inlet 29 and discharges it at a higher pressure into diffusion chamber 36. Pump 35 is a variable speed pump governed by pressure sensors in the inlet region. The pump may be, for example, a Goulds 6DHLC 2-stage LS Bowl pump powered by a S12972 460 V 3ph 10 HP submersible motor. A pressure transducer located within the interior of inlet 29, and providing 1 ft. of amplitude control, sends signals to an ABB variable frequency drive 15 HP controller. The controller is located on cart 13 and will vary the frequency of the power to the pump motor 41 such that the pump 35 operates at the right speed at all times.

Diffusion chamber 36 has a relatively long thin slot on the top side which spreads the compact concentrated stream coming out of pump 35 into a confined stream wide in the direction longitudinal to conduit 22 and narrow in the direction lateral to conduit 22 so that this confined stream can pass through traveling opening 23 in stationary closed conduit 22 with as little disruption to the structural integrity and continuity of said conduit 22 as possible. The component of pressurizing pickup shoe 24 that extends through traveling opening 23 in said conduit 22 is called the neck or riser portion and is given designation 37 in the drawings. Neck or riser portion 37 has a non-cylindrical elongated cross-section. Water passes from neck 37 into concentrating chamber 38 through a long thin slot in concentrating chamber 38. Concentrating chamber 38 consolidates the water flow into a compact stream and feeds said water flow into vertical pipe 15 of the linear irrigation system.

In addition to conveying water out of stationary closed conduit 22, neck or riser portion 37 must also convey energy down into conduit 22 in order to operate pump 35. Therefore, a small portion of neck 37 is divided off from the water carrying portion by wall 39. Wall 39 extends out and forms one end of both diffusing chamber 36 and concentrating chamber 38. Either hydraulic or electrical energy is supplied through duct 40 to motor 41, which converts it to mechanical energy and transmits said mechanical energy to pump 35 via shaft 42. A combination bearing and seal 43 is mounted on wall 39 and supports shaft 42. Motor 41 is housed in motor housing 44. Bearing 45 is mounted in the base of fairing 46 and supports shaft 42. The function of fairing 46 is to facilitate a smooth transition of conduit 22 between being full of water and being empty, as depicted in FIGS. 3 and 4. When the linear irrigation system and hence the pressurizing pickup shoe are moving to the right in FIG. 6, fairing 46 will penetrate into the collapsed portion of conduit 22 and open up the cross section. Seam 25 will remain closed until it reaches slider 26b. When the systems are moving to the left in FIG. 6, fairing 46 will help the collapsing portion of conduit 22 to lay out smoothly. Fasteners 47 attach fairing 46 to motor housing 44.

Heretofore, the various components of the pressurizing pickup shoe 24 have been discussed with regard to function. Turning to manufacturing and assembly, flared inlet 29 requires a smooth and gradual transition in cross-sectional shape between the leading edge, location 30, and the trailing edge 32 such that flared inlet 29 may be most conveniently constructed out of fiberglass over a suitable mold. The most economical and practical shape for diffusion chamber 36, concentrating chamber 38, pump housing 33, and motor housing 44 are cylindrical. Pump housing 33 and diffusion chamber 36 can be one monolithic piece. Short lengths of the same tubing can be used for concentrating chamber 38 and motor housing 44. Wall 39 is cut out and welded to the appropriate ends of diffusion chamber 36 and concentrating chamber 38. Motor housing 44 is aligned with diffusing chamber 36 and welded to wall 39 on the assembly. Two plates are formed and welded to the assembly to make neck 37. Pump 35 is inserted into pump housing 33 from the flared inlet 29 end of said pump housing 33. Motor 41 is inserted into motor housing 44 from the fairing 46 end of motor housing 44. Although shown in FIG. 6, sliders 26a and 26b are assembled with stationary closed conduit 22. Standard and known techniques can be used for the remainder of the fabrication and assembly of pressurizing pickup shoe 24.

Figure 7:
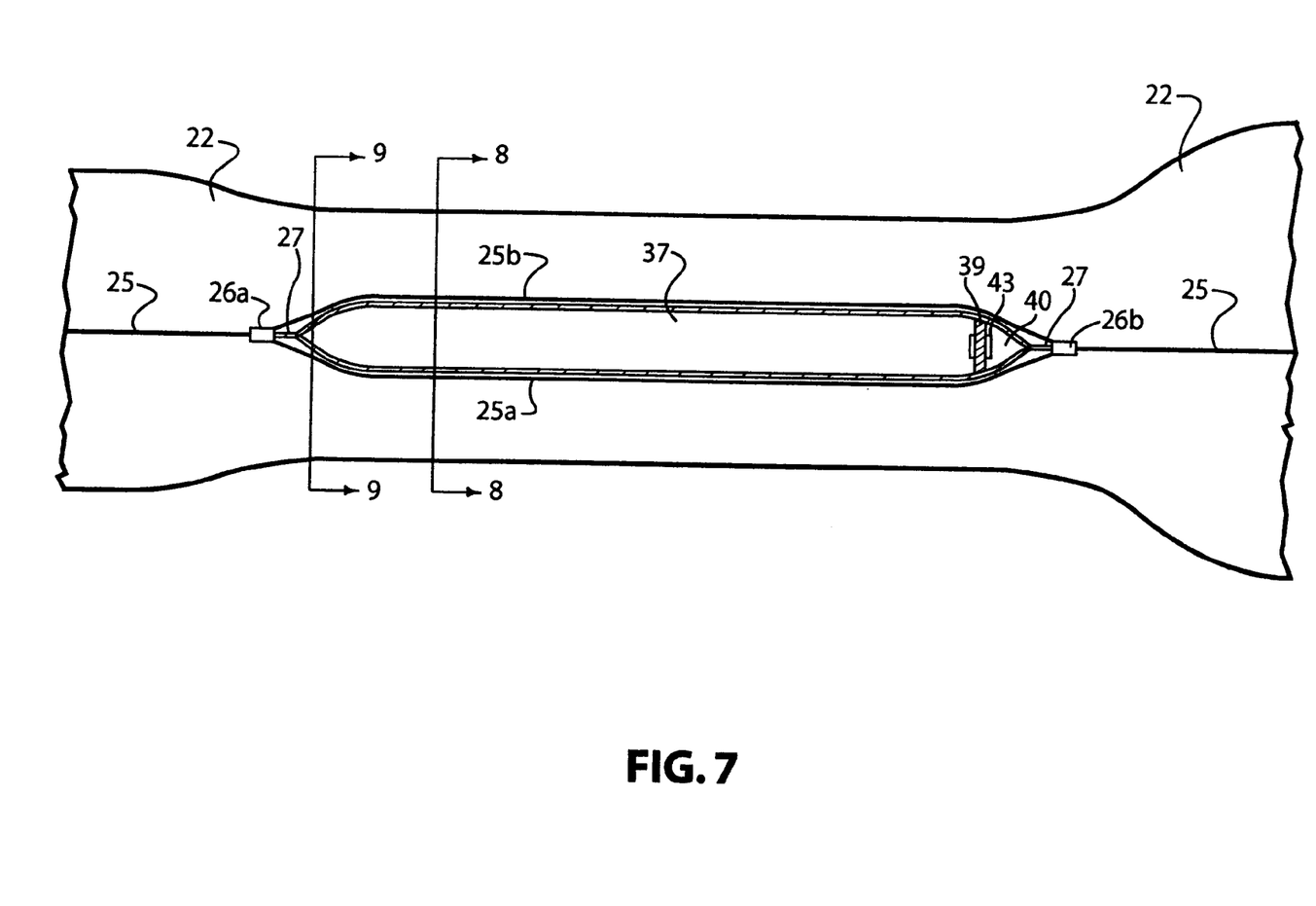
FIG. 7 is a plan view of that portion of the pressurizing pickup shoe that would remain after a horizontal cut through the flattened and streamlined neck of the pressurizing pickup shoe.

FIG. 7 is a plan view of that portion of the pressurizing pickup shoe 24 that would remain after a horizontal cut through neck 37 at a location just below the point where neck 37 meets concentrating chamber 38. Thus, as shown, neck 37 has a non-cylindrical, elongated cross-section. The forward and rearward ends of neck 37 are slightly pointed. This shape results in a minimal gap between the neck and the conduit 22 in the traveling opening, thereby reducing the possibility of dirt or other contaminants entering the reclosable fastener assembly and/or the stationary closed conduit. When seam 25 is in the open position, the two separated halves are designated 25a and 25b. Seam half 25b was behind neck 37 and not visible in FIG. 5. Thus, 25b appears for the first time in FIG. 7. For purposes of clarity, shaft 42 is not shown in FIG. 7 even though it would be visible in the cavity of neck 37. However, the combination bearing and seal 43 that supports shaft 42 in wall 39 is shown in FIG. 7.

Figure 8:
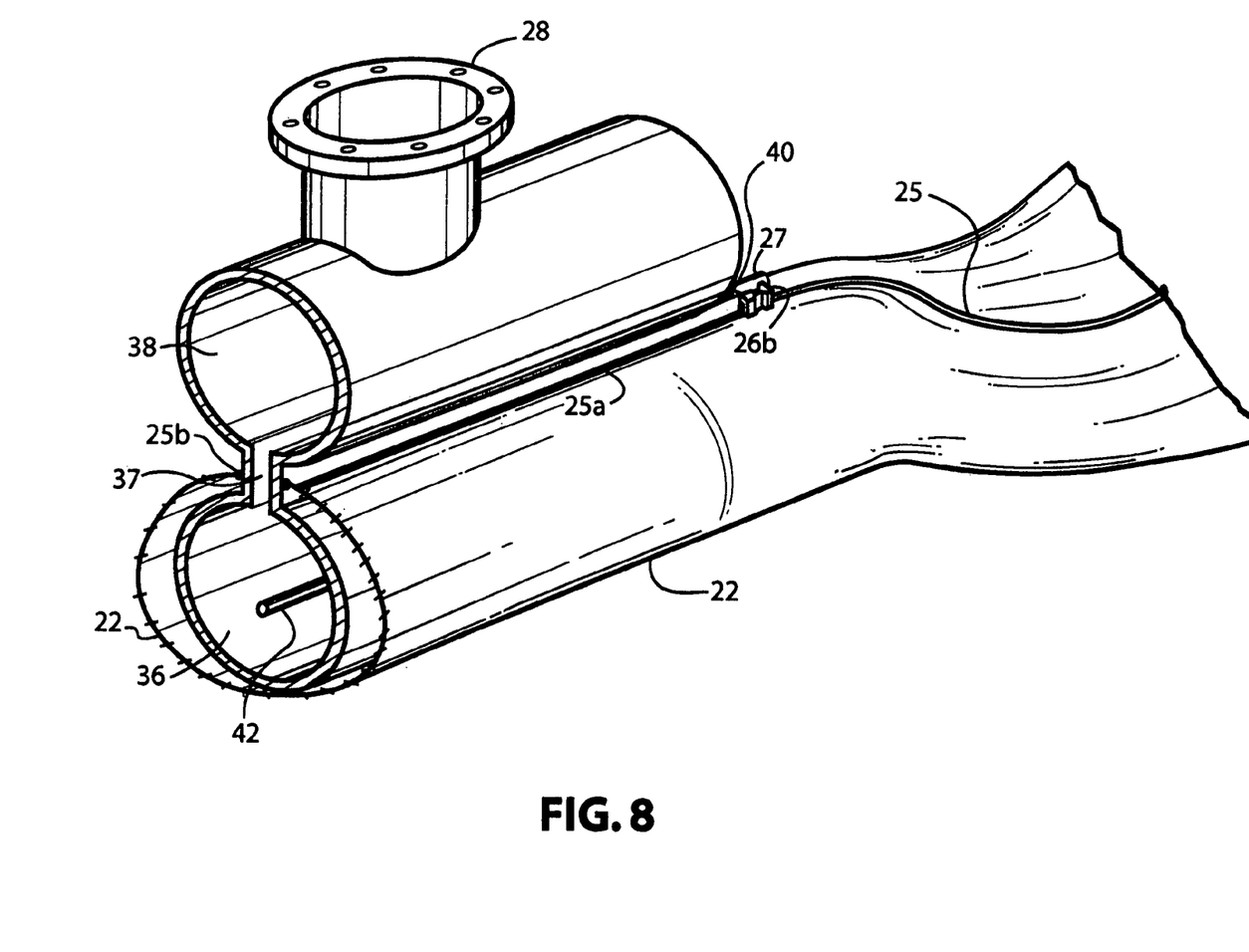
FIG. 8 is a perspective view of that portion of the pressurizing pickup shoe that would remain after a lateral cut along plane 8-8, as indicated by line 8-8 on FIG. 7.

FIG. 8 is a perspective view of that portion of pressurizing pickup shoe 24 that would remain after a lateral cut through the forward portion of said pressurizing pickup shoe 24 at the location indicated on FIG. 7 by line 8-8. Again, because the walls of conduit 22 are too thin to be properly illustrated at the cutting plane by a pair of lines with cross-hatching between them, the wall of conduit 22 is illustrated at the cutting plane by a single line with cross-hatching across said single line.

Figure 9:
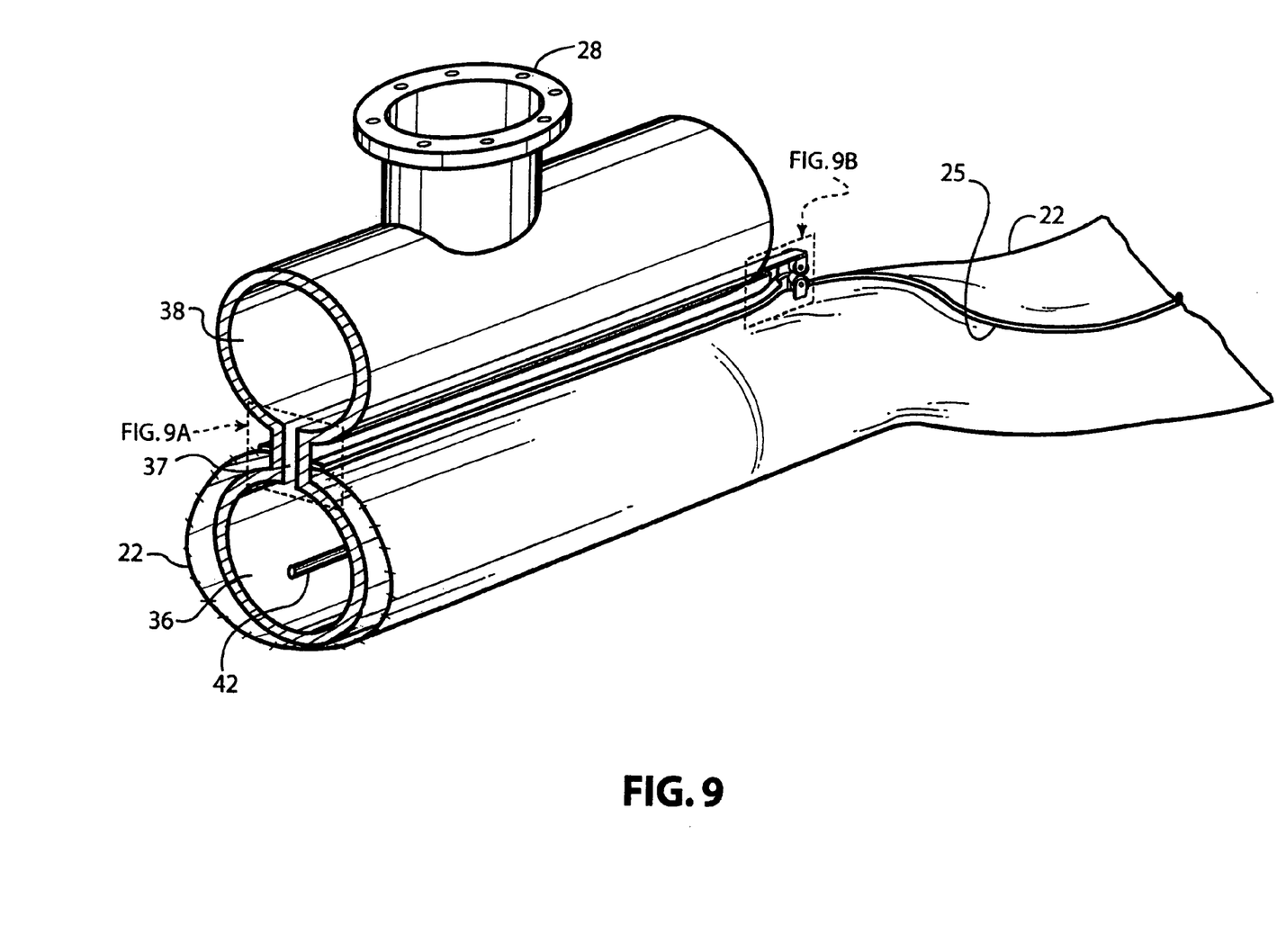
FIG. 9 is a perspective view similar to FIG. 8 except that FIG. 9 illustrates the connection apparatus necessary when a press fit type of closure fastening device is utilized. The location of the lateral cut of FIG. 9 is indicated by line 9-9 in FIG. 7.
Figure 9A:
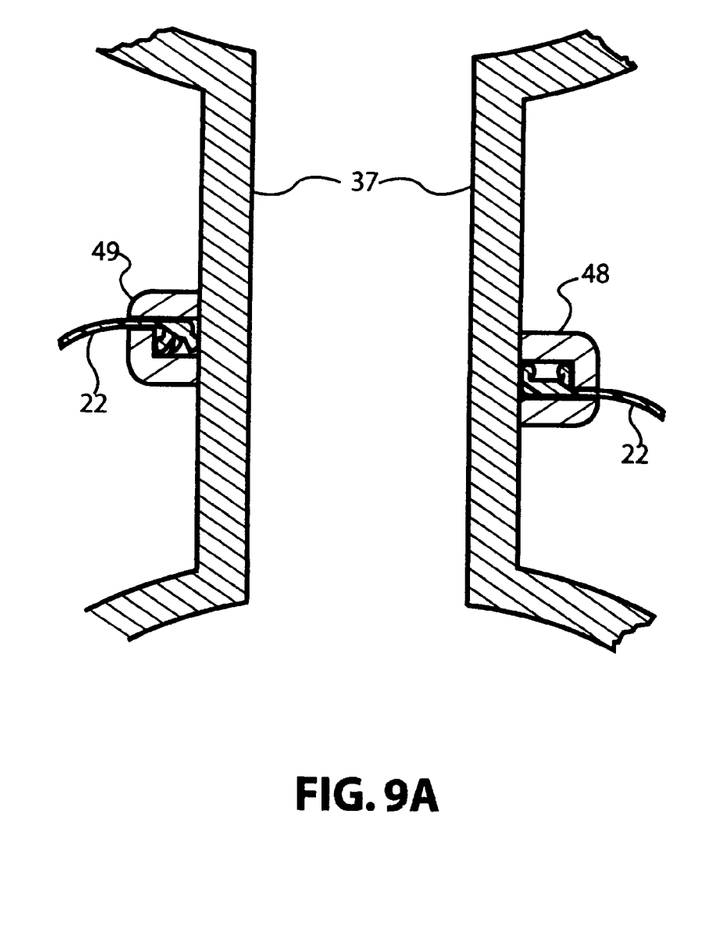
FIG. 9A is an enlarged view of a portion of the cross-sectional cut of FIG. 9 illustrating the guideways that hold the closure fastening device while it is disengaged.
Figure 9B:
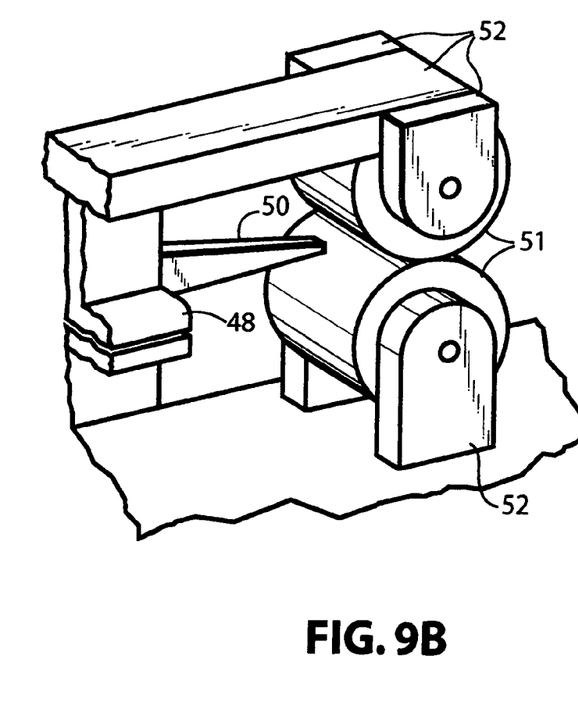
FIG. 9B is an enlarged view of a portion of FIG. 9 that illustrates the roller mechanism that is used to open and close the closure fastening device.

FIG. 9 is similar to FIG. 8 except that FIG. 9 illustrates a press fit type of closure fastening device in place of the double slider arrangement illustrated in FIG. 8. U.S. Pat. No. 4,212, 337 discloses an example of a press fit type of closure fastening device. A press fit type of closure may require that the two halves of seam 25 be held in guides when they are separated and include an apparatus for pressing the two halves together. FIG. 9 and FIG. 9A illustrate the guideways. One guideway 48 would hold half seam 25a and another guideway 49 would hold half seam 25b. FIG. 9B illustrates a tapered finger 50 that would slide into the cavity of seam 25 in order to open said seam 25 by separating half seam 25a from half seam 25b. FIG. 9B also illustrates a pair of rollers 51 that press seam half 25b into seam half 25a, thereby causing them to meld into seam 25. Rollers 51 are supported by brackets 52a and 52b. Brackets 52a are attached to pressurizing pickup shoe 24 on the outside of stationary closed conduit 22, and brackets 52b are attached to pressurizing pickup shoe 24 at a location that is inside stationary closed conduit 22. Another tapered finger 50, a pair of rollers 51 and their supporting brackets 52a and 52b are also located on the opposite end of neck 37 of pressurizing pickup shoe 24 and not shown in FIG. 9.

Figure 10:
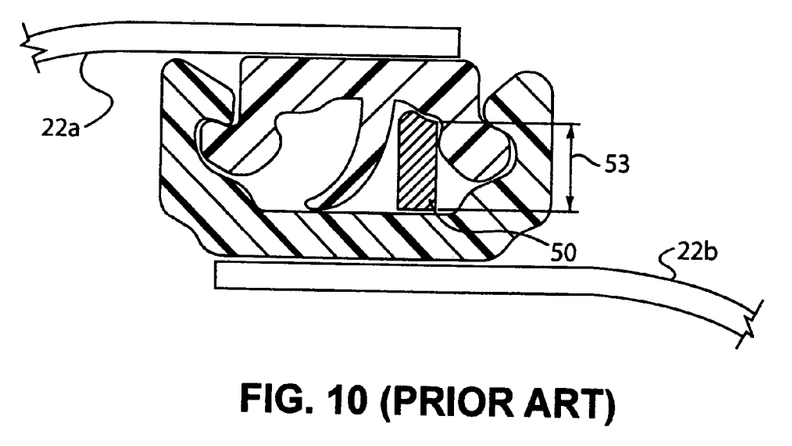
FIG. 10 illustrates a prior art type of closure fastening device from U.S. Pat. No. 4,212,337 that can be utilized in the present invention.

FIG. 10 is similar to FIG. 7 of U.S. Pat. No. 4,212,337 with the numerical designations of that patent removed and with finger 50 added to the illustration. Finger 50 is tapered so that as said finger 50 moves in one direction with respect to the closure fastening device, dimension 53 will become larger and the closure fastening device will be pried open. When finger 50 moves in the opposite direction, dimension 53 will become smaller and finger 50 will disengage from the closure fastening device.

Figure 11:
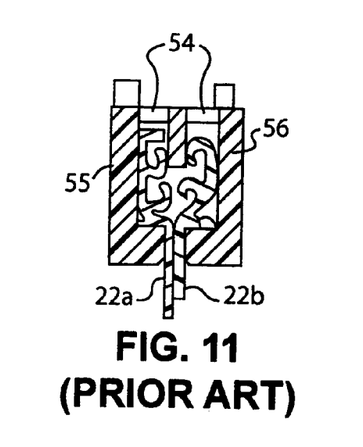
FIG. 11 illustrates another type of prior art closure fastening device from U.S. Pat. No. 5,664,299 that can also be utilized in the present invention.
Figure 12:
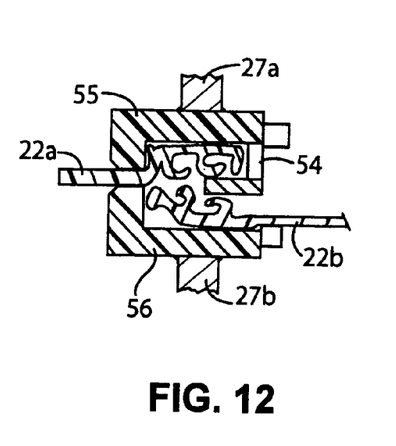
FIG. 12 is similar to FIG. 11 except that a modification has been made wherein the walls of the zipper profile extend in opposite directions from the slider.

FIGS. 11 and 12 illustrate how a slight modification to prior art can make closure fastening devices that were developed primarily to seal household containers better suited for use in the present invention. Household containers require complete closure at both ends of the zipper profile. This can be best attained if the walls to be sealed together both enter the slider on the bottom of the slider and the two sides of the slider are interconnected across the top of the slider. This arrangement will work in the present invention but the seam that is formed will protrude outward from a line defining the circumference of the stationary closed conduit and may be subject to damage from ordinary wear and tear.

FIG. 11 is similar to FIG. 3 of U.S. Pat. No. 5,664,299 with the numerical designations of that patent removed and new numerical designations added. FIG. 11 is a cross-sectional view of a slider from the '299 patent near the front of the slider where the zipper profile is open. The two container walls that are about to be joined and sealed together enter the slider from the bottom. The stradling slider has an inverted U-shaped member having an integral top 54 and side walls 55 and 56. For use in the present invention, the two container walls become walls 22a and 22b of stationary closed conduit 22, and slider 26 is attached to bracket 27 by any suitable connection between bracket 27 and the inverted U structure of slider 26 consisting of top 54 and side walls 55 and 56.

FIG. 12 illustrates a similar slider that has had part of top 54 removed and has been turned on its side so that walls 22a and 22b can enter the slider from opposite sides. Because top 54 provided structural integrity between walls 55 and 56, an alternative means of holding walls 55 and 56 in position must be provided. One of the walls 55 and 56 is now on the inside of stationary closed conduit 22, and the other is on the outside such that the alternative structural connection between walls 55 and 56 must pass through traveling opening 23. Pressurizing pickup shoe 24 passes through traveling opening 23. Thus, the modification to the slider that is illustrated in FIG. 12 requires a pair of brackets 27a and 27b for each slider, one of which is mounted on that portion of pressurizing pickup shoe 24 that is on the outside of stationary closed conduit 22, and the other of which is mounted on that portion of said pressurizing pickup shoe 24 which is on the inside of said stationary closed conduit 22.

FIGS. 13, 14, 15 and 16 illustrate a second embodiment of the invention wherein a rigid stationary closed conduit 57 is substituted for collapsible stationary closed conduit 22. Rigid stationary closed conduit 57 has a longitudinal slit 58 that serves the same purpose as seam 25 in collapsible stationary closed conduit 22. Slit 58 is normally held closed and sealed by spring-like forces that can be created by pre-stressing forces in the walls of said rigid stationary closed conduit 57, or by other means. When a linear irrigation system moves along rigid stationary closed conduit 57, one half of a double wedge-shaped neck or riser on a specially adapted pressurizing pickup shoe pries slit 58 open to create traveling opening 23.

Figure 13:
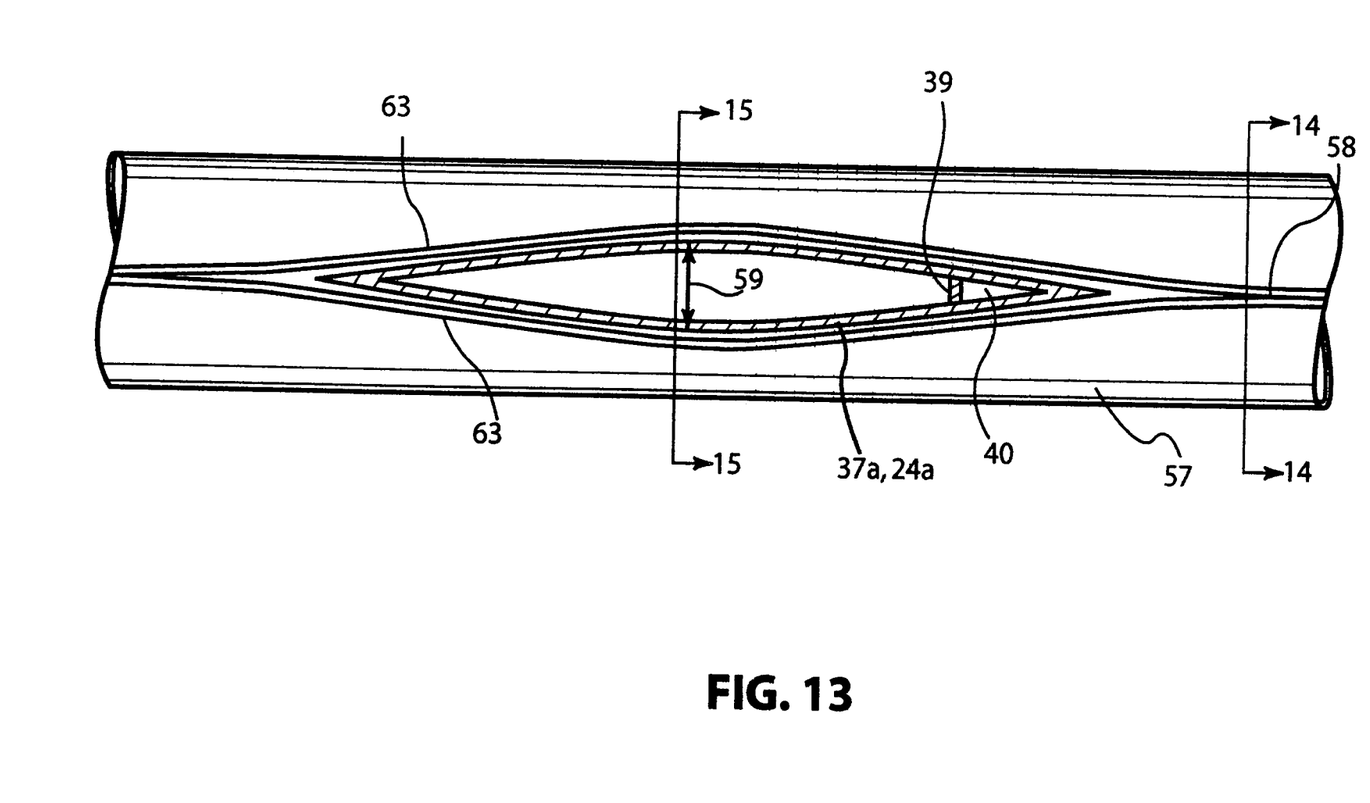

FIG. 13 is similar to FIG. 7 and is a plan view of that portion of a specially adapted pressurizing pickup shoe 24a that would remain after a horizontal cut through neck 37a of said pressurizing pickup shoe 24a at a location just below the point where neck 37a meets concentrating chamber 38. Dimension 59 is the maximum width of neck 37a. The value of dimension 59 is governed by the amount of deflection that can be imposed on rigid stationary closed conduit 57 without damage to said conduit 57. The length of neck 37a is as necessary to pass the required amount of water from rigid stationary closed conduit 57 to the linear irrigation system. Pressurizing pickup shoe 24a is similar to pressurizing pickup shoe 24 except that neck 37a is shaped to conform with the traveling opening in rigid stationary closed conduit 57, the flared inlet 29 is shaped to conform to the inside of rigid stationary closed conduit 57, and fairing 46 is not required. Again, for purposes of clarity, shaft 42 is not shown on FIG. 13 even though it would be visible in the cavity of neck 37a.

Figure 14:
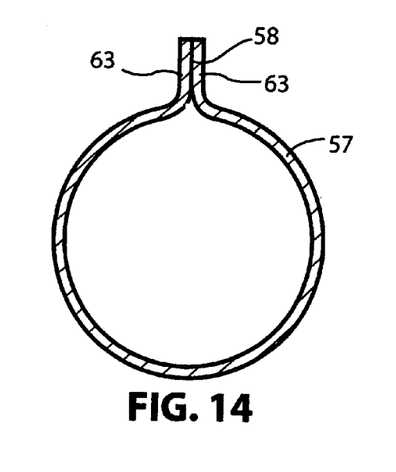
FIG. 14 is a cross-sectional view of a rigid stationary closed conduit as utilized in the second embodiment of the invention. The cross-section is taken along line 14-14 in FIG. 13.
Figure 15:
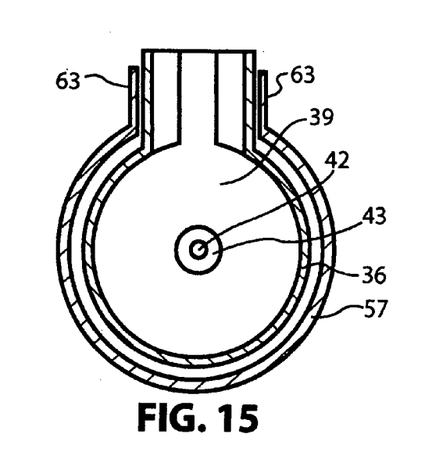
FIG. 15 is a cross-sectional view of a rigid stationary closed conduit taken at a location where the rigid stationary closed conduit is pried open by the pressurizing pickup shoe as indicated by line 15-15 on FIG. 13.

FIGS. 14 and 15 are cross-sectional views of rigid stationary closed conduit 57 taken along lines 14-14 and 15-15, respectively, of FIG. 13. FIG. 14 illustrates a cross section at a location away from pressurizing pickup shoe 24a where spring forces hold slit 58 closed. FIG. 15 is a cross section near the center of pressurizing pickup shoe 24a where rigid stationary closed conduit 57 has been pried open by said pressurizing pickup shoe 24a.

Figure 16:
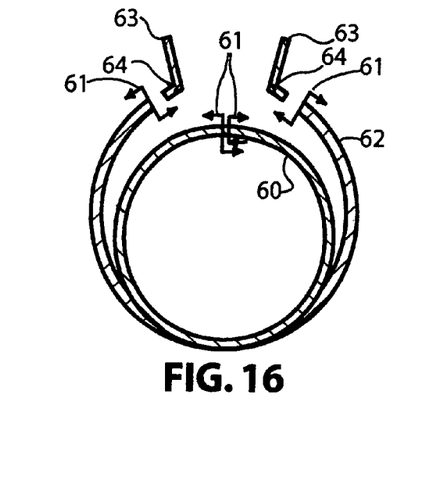
FIG. 16 illustrates a method for assembling the rigid stationary closed conduit utilized in the second embodiment of the invention to get the necessary pre-stressing forces for holding the seam closed.

FIG. 16 illustrates one method for pre-stressing the walls of rigid stationary closed conduit 57 in order to establish the spring-like forces that will hold slit 58 in a normally closed and sealed configuration. A circular pipe with a cross section as designated by numeral 60 in FIG. 16 is manufactured by known methods. The diameter of pipe 60 is smaller than the desired final diameter of rigid stationary closed conduit 57 and has circumferential reinforcing near the inside edge of the wall. Next, a longitudinal slit is cut and twisting couples 61 are applied to both sides of the slit such that the cross section opens up to position 62. Then, flanges 63 with legs 64 are attached to the edges of the slit in pipe 60, said legs 64 becoming part of the circumference of rigid stationary closed conduit 57. When twisting couples 61 are released, the material that originally comprised pipe 60 will attempt to return to its original configuration but will be unable to do so because legs 64 and part of flanges 63 are in the way. Pipe 60 will then assume a new position with a larger diameter and a pre-stress that will hold slit 58 normally closed and become a part of rigid stationary closed conduit 57.

Reinforcing in the walls of pipe 60 can be designed to give the desired stiffness in both the longitudinal and circumferential directions by complicated but known methods of structural analysis such as curved beam analysis and orthogonally anisotropic analyses. Other techniques for obtaining pre-stressing forces are known.

Other variants are possible without departing from the scope of this invention.

What is claimed is:

1. In a water supply system for a moving irrigation system comprising a stationary closed conduit with a traveling opening therein and a pickup shoe which extends into said conduit through said traveling opening for intercepting any water flowing in said conduit and supplying water to said moving irrigation system; wherein the improvement comprises pump means within said pickup shoe for pressurizing the intercepted water and discharging the intercepted water upwardly through said pickup shoe; wherein said pickup shoe is operatively connected to said moving irrigation system for supplying water from said conduit to said irrigation system; wherein said stationary closed conduit comprises a collapsible thin-walled plastic tube having a longitudinal slit, wherein said slit is sealed by a reclosable fastener assembly that can be parted to form said traveling opening; and wherein said plastic tube has a bottom surface which is generally planar when filled with water.

2. The water supply system of claim 1, wherein said reclosable fastener assembly comprises a pair of complementary-shaped fastener sections which fasten to each other to form a seam.

3. The water supply system of claim 2, wherein said reclosable fastener assembly comprises first and second sliders which delineate said traveling opening; wherein said pickup shoe includes a riser portion; wherein said first slider is adapted to separate or join said fastener sections upstream of said riser portion of said pickup shoe, and said second slider is adapted to join or separate said fastener sections together downstream of said riser portion of said pickup shoe.

4. The water supply system of claim 2, wherein said fastener sections fasten to each other by a press fit.

5. The water supply system of claim 2, further comprising two guideways for holding the two complementary-shaped fastener sections while said fastener sections are disengaged from each other.

6. The water supply system of claim 1, wherein said pickup shoe includes a flared inlet of a size and shape such that it conforms approximately to the cross-sectional shape of said conduit when said conduit is filled with water.

7. The water supply system of claim 1, wherein said pump means comprises a variable speed pump.

8. The water supply system of claim 1, wherein said pickup shoe includes a riser portion which has a non-cylindrical, elongated shape, and wherein water is transferred from said conduit to said irrigation system through said riser portion.

9. The water supply system of claim 8, wherein said riser portion comprises a first compartment for conveying water upwardly through said riser portion from said conduit, and a second compartment for conveying electrical or hydraulic power to said pump means in said shoe.

10. In a water supply system for a moving irrigation system comprising a stationary closed conduit with a traveling opening therein and a pickup shoe which extends into said conduit through said traveling opening for intercepting any water flowing in said conduit and supplying water to said moving irrigation system; wherein the improvement comprises a rigid conduit having a longitudinal slit extending along the length of said conduit; wherein said slit is normally closed by spring forces built into the wall of said conduit or which press against the exterior of said wall; and wherein said pickup shoe comprises wedges for prying open said slit to form said traveling opening.

11. In a water supply system for a moving irrigation system comprising a stationary closed conduit with a traveling opening therein and a pickup shoe which extends into said conduit through said traveling opening for intercepting any water flowing in said conduit and supplying water to said moving irrigation system; wherein the improvement comprises pump means within said pickup shoe for pressurizing the intercepted water and discharging the intercepted water upwardly through said pickup shoe; wherein said pickup shoe is operatively connected to said moving irrigation system for supplying water from said conduit to said irrigation system; wherein said conduit comprises a rigid conduit having a longitudinal slit that is normally closed by spring forces built into the wall of said conduit or which press against the exterior of said wall.

12. The water supply system of claim 11, wherein said pickup shoe includes a riser portion which has a non-cylindrical, elongated shape, and wherein water is transferred from said conduit to said irrigation system through said riser portion.

13. The water supply system of claim 12, wherein said riser portion comprises a first compartment for conveying water upwardly through said riser portion from said conduit, and a second compartment for conveying electrical or hydraulic power to said pump means in said shoe.

* * * * *